(12) United States Patent
Passley (10) Patent No.: US 11,597,515 B2
(45) Date of Patent: Mar. 7, 2023

(54) CHARGING/RE-CHARGING DRONE ASSEMBLY SYSTEM AND APPARATUS

(71) Applicant: Shaun Passley, Wheeling, IL (US)

(72) Inventor: Shaun Passley, Wheeling, IL (US)

(73) Assignee: EPAZZ, INC., Chicago, IL (US)

(*) Notice: Subject to any disclaimer, the term of this patent is extended or adjusted under 35 U.S.C. 154(b) by 261 days.

(21) Appl. No.: 16/997,735

(22) Filed: Aug. 19, 2020

(65) Prior Publication Data

US 2021/0053677 A1 Feb. 25, 2021

Related U.S. Application Data

(60) Provisional application No. 62/959,048, filed on Jan. 9, 2020, provisional application No. 62/892,834, filed on Aug. 28, 2019, provisional application No. 62/888,544, filed on Aug. 19, 2019.

(51) Int. Cl.

| | | |
|---|---|---|
| *B64C 39/02* | (2023.01) | |
| *B64F 1/00* | (2006.01) | |
| *B64U 50/19* | (2023.01) | |
| *B64U 50/34* | (2023.01) | |
| *B64U 70/20* | (2023.01) | |

(52) U.S. Cl.
CPC ............ *B64C 39/024* (2013.01); *B64F 1/007* (2013.01); *B64U 50/19* (2023.01); *B64U 50/34* (2023.01); *B64U 70/20* (2023.01)

(58) Field of Classification Search
CPC ............ B64C 39/024; B64C 2201/042; B64C 2201/066; B64C 2201/082; B64C 2201/027; B64C 2201/108; B64F 1/007; B64U 50/19; B64U 50/34; B64U 70/20; B64U 10/13; B64U 30/20
See application file for complete search history.

(56) References Cited

U.S. PATENT DOCUMENTS

| | | | | |
|---|---|---|---|---|
| 8,245,469 | B2 * | 8/2012 | Rubel | E04B 5/48 |
| | | | | 52/223.6 |
| 8,256,172 | B2 * | 9/2012 | Benson | E04F 15/02183 |
| | | | | 52/489.1 |
| 8,297,552 | B2 * | 10/2012 | Ying | B64F 1/007 |
| | | | | 244/114 R |
| 9,056,676 | B1 * | 6/2015 | Wang | B60R 9/00 |
| 9,126,693 | B1 * | 9/2015 | Shi | G05B 11/42 |
| 9,290,277 | B2 * | 3/2016 | You | B64F 1/18 |
| 9,296,492 | B2 * | 3/2016 | Ying | B64F 1/222 |
| 9,387,928 | B1 * | 7/2016 | Gentry | B60L 53/00 |
| 9,421,869 | B1 * | 8/2016 | Ananthanarayanan | B64D 5/00 |
| 9,457,899 | B2 * | 10/2016 | Duffy | B64C 37/02 |
| 9,527,605 | B1 * | 12/2016 | Gentry | B65G 51/02 |
| 9,551,989 | B2 * | 1/2017 | Scarlatti | B64C 39/024 |

(Continued)

*Primary Examiner* — Medhat Badawi
(74) *Attorney, Agent, or Firm* — Justin Lampel (57) ABSTRACT

A charging and recharging drone assembly system and apparatus are provided. The system has a unique charging pad having a plurality of cones which direct the legs of a charging drone into a specific location on the charging pad for charging/re-charging. A QR code may be located in the middle of a cover of a charging pad so that the charging drone may detect the charging pad from the air and may direct the charging drone to land on a specific spot on the landing pad for charging. The movable cover may cover the charging pad when the charging pad is not in use to protect the charging pad.

11 Claims, 5 Drawing Sheets

(56) References Cited

U.S. PATENT DOCUMENTS

| | | | | |
|---|---|---|---|---|
| 9,589,448 | B1* | 3/2017 | Schneider | F41H 11/00 |
| 9,643,722 | B1* | 5/2017 | Myslinski | H04N 7/183 |
| 9,783,075 | B2* | 10/2017 | Henry | B64D 45/08 |
| 9,957,045 | B1* | 5/2018 | Daly | B64C 37/02 |
| 10,035,589 | B2* | 7/2018 | Zhang | B64C 27/08 |
| 10,046,863 | B2* | 8/2018 | Ying | B64F 1/005 |
| 10,099,561 | B1* | 10/2018 | Ananthanarayanan | B60L 53/32 |
| 10,310,501 | B2* | 6/2019 | Greenberger | H02J 7/342 |
| 10,358,214 | B2* | 7/2019 | Zhang | B64C 27/08 |
| 10,719,080 | B2* | 7/2020 | Zhang | G05D 1/0088 |
| 10,882,410 | B2* | 1/2021 | Renold | B60L 53/35 |
| 10,967,970 | B2* | 4/2021 | Van Niekerk | B64C 39/024 |
| D932,369 | S* | 10/2021 | Passley | D12/16.1 |
| 11,148,808 | B2* | 10/2021 | Wiggerich | B64D 1/22 |
| 11,370,561 | B2* | 6/2022 | Ratajczak | B64F 1/364 |
| 2007/0176432 | A1* | 8/2007 | Rolt | H01R 13/639 290/55 |
| 2008/0217486 | A1* | 9/2008 | Colten | B64C 39/024 244/45 R |
| 2009/0057486 | A1* | 3/2009 | Becht, IV | B64F 1/007 244/114 R |
| 2010/0170993 | A1* | 7/2010 | Misegades | B64C 7/00 244/130 |
| 2010/0320313 | A1* | 12/2010 | Hanafin | B64F 1/125 244/114 R |
| 2011/0174925 | A1* | 7/2011 | Ying | B64F 1/005 701/16 |
| 2013/0233964 | A1* | 9/2013 | Woodworth | B64C 25/58 244/175 |
| 2015/0175276 | A1* | 6/2015 | Koster | B64F 1/32 244/114 R |
| 2015/0336677 | A1* | 11/2015 | Smaoui | H02J 7/0026 320/109 |
| 2016/0001883 | A1* | 1/2016 | Sanz | B64C 39/024 244/17.23 |
| 2016/0068264 | A1* | 3/2016 | Ganesh | G06Q 30/0637 701/4 |
| 2016/0101856 | A1* | 4/2016 | Kohstall | B64C 39/028 244/17.23 |
| 2016/0144982 | A1* | 5/2016 | Sugumaran | B64C 25/32 244/108 |
| 2016/0196756 | A1* | 7/2016 | Prakash | G08G 5/025 701/3 |
| 2016/0257426 | A1* | 9/2016 | Mozer | B64F 1/362 |
| 2016/0286128 | A1* | 9/2016 | Zhou | H04L 65/1069 |
| 2016/0291445 | A1* | 10/2016 | Fisher, Sr. | F16M 11/10 |
| 2016/0304217 | A1* | 10/2016 | Fisher | B60L 53/51 |
| 2016/0311329 | A1* | 10/2016 | Rodriguez | B64C 39/028 |
| 2016/0340021 | A1* | 11/2016 | Zhang | B64C 27/08 |
| 2016/0355261 | A1* | 12/2016 | Chin | B64C 39/024 |
| 2016/0364989 | A1* | 12/2016 | Speasl | G06Q 10/08 |
| 2016/0378108 | A1* | 12/2016 | Paczan | B64D 31/06 705/330 |
| 2017/0011333 | A1* | 1/2017 | Greiner | B64D 1/02 |
| 2017/0023949 | A1* | 1/2017 | Fisher | G08G 5/0039 |
| 2017/0050749 | A1* | 2/2017 | Pilskalns | B64F 1/362 |
| 2017/0081043 | A1* | 3/2017 | Jones | B64C 37/02 |
| 2017/0121023 | A1* | 5/2017 | High | B64D 9/00 |
| 2017/0129464 | A1* | 5/2017 | Wang | B64C 39/024 |
| 2017/0129603 | A1* | 5/2017 | Raptopoulos | B64C 39/024 |
| 2017/0225782 | A1* | 8/2017 | Kohstall | B64C 1/063 |
| 2017/0275025 | A1* | 9/2017 | Johnson | B60L 53/16 |
| 2017/0323129 | A1* | 11/2017 | Davidson | G05D 1/0234 |
| 2018/0039286 | A1* | 2/2018 | Tirpak | G05D 1/042 |
| 2018/0233055 | A1* | 8/2018 | Damnjanovic | B64C 39/024 |
| 2018/0319496 | A1* | 11/2018 | Zhang | B64C 39/024 |
| 2018/0327091 | A1* | 11/2018 | Burks | B64F 1/007 |
| 2019/0016476 | A1* | 1/2019 | Scherz | B64C 39/024 |
| 2019/0023133 | A1* | 1/2019 | Renold | B64F 1/007 |
| 2019/0047462 | A1* | 2/2019 | Vijayaraghavan | G05D 1/0088 |
| 2019/0055018 | A1* | 2/2019 | Bei | B64D 47/08 |
| 2019/0100108 | A1* | 4/2019 | Davis | H02J 50/00 |
| 2019/0217952 | A1* | 7/2019 | Zawadzki | B64D 1/02 |
| 2019/0233107 | A1* | 8/2019 | Tian | B64C 39/024 |
| 2019/0245365 | A1* | 8/2019 | Farrahi Moghaddam | B60L 53/14 |
| 2019/0256207 | A1* | 8/2019 | Nohmi | B63C 11/00 |
| 2019/0283871 | A1* | 9/2019 | Wieczorek | B64C 39/024 |
| 2020/0017237 | A1* | 1/2020 | Walker | B64D 45/04 |
| 2020/0044463 | A1* | 2/2020 | Kim | H02J 7/35 |
| 2020/0165008 | A1* | 5/2020 | Krauss | B64F 1/00 |
| 2020/0218287 | A1* | 7/2020 | Wang | B64C 39/022 |
| 2020/0218288 | A1* | 7/2020 | Johnson | G01S 15/93 |
| 2020/0369408 | A1* | 11/2020 | Dolata | B60L 53/20 |
| 2020/0406773 | A1* | 12/2020 | Lacaze | B64F 1/364 |
| 2021/0053677 | A1* | 2/2021 | Passley | B64C 39/024 |
| 2021/0284356 | A1* | 9/2021 | Jourdan | G08G 5/0021 |
| 2021/0354820 | A1* | 11/2021 | Hiller | B60L 53/18 |
| 2022/0019247 | A1* | 1/2022 | Dayan | B64F 1/222 |
| 2022/0041279 | A1* | 2/2022 | Rowse | B64C 1/00 |
| 2022/0073214 | A1* | 3/2022 | Liske | B64D 9/00 |

* cited by examiner

CHARGING/RE-CHARGING DRONE ASSEMBLY SYSTEM AND APPARATUS

CROSS-REFERENCE TO RELATED APPLICATIONS

The following application is based on and claims the priority benefit of U.S. provisional application Ser. No. 62/959,048 filed Jan. 9, 2020; 62/888,544 filed Aug. 19, 2019 and 62/892,834 filed Aug. 28, 2019; the entire contents of which are incorporated by reference.

BACKGROUND OF THE INVENTION

A charging and recharging drone assembly system and apparatus are provided. The system has a unique charging pad having a plurality of cones which direct the legs of a charging drone into a specific location on the charging pad for charging/re-charging. A QR code may be located in the middle of a cover of a charging pad so that the charging drone may detect the charging pad from the air and may direct the charging drone to land on a specific spot on the landing pad for charging. The movable cover may cover the charging pad when the charging pad is not in use to protect the charging pad. When the charging drone approaches the charging pad the charging pad cover opens and exposes a second QR Code located on the top of the actual charging pad. A second (or "main") drone may be charged while airborne by the charging drone which may provide fresh battery power to the main drone.

Prior drone charging systems are known. For example, U.S. Pat. No. 10,461,547 to Lee discloses a portable drone battery charger that charges a variety of batteries of different capacities as well as voltage levels is provided. The drone battery charger operates from an internal battery and may charge a drone battery multiple times because the capacity of the drone battery charger internal battery is many times larger than the done battery.

Further, U.S. Pat. No. 10,112,728 to Evans discloses a charging system for a drone carrying a passenger pod has a base structure connected to a power grid, a row of substantially planar wireless charging pads supported by the base structure, and a computerized controller enabled to communicate with a drone and to initiate, control and stop charging power. As a drone carrying a passenger pod approaches the charging-system, the computerized controller directs the moving drone into a path bringing a charging receiver pad of the passenger pod carried by the drone, and connected to a battery of the passenger pod, into proximity with the row of substantially planar charging pads, and directs the drone to move the carried passenger pod along the row of charging pods, managing speed and direction of the moving drone along the path, as charging of the battery of the passenger pod is accomplished.

Still further, U.S. Pat. No. 10,618,653 to Han discloses a charging system by autonomous guide of drone includes a drone for being autonomously guided to a charging station on the basis of location and altitude coordinates for charging and for transmitting a charged information to a control station when the charging is completed; a charging station for recognizing the approach of the drone within a chargeable range and for controlling the guide flight of the drone and transmitting a charged information to the control station when the charging is completed; and a control station for detecting the state of charge of the drone in real time and for transmitting a location coordinate and altitude coordinate of the charging station to the drone for guiding flight to the charging station.

However, these patents fail to describe a drone charging/re-charging assembly which is easy to use. Further, these patents fail to describe a drone charging/re-charging assembly which utilizes a cone-shaped charging pad having a QR Code to direct the drone for charging/re-charging the drone.

SUMMARY OF THE INVENTION

A charging and recharging drone assembly system and apparatus are provided. The system has a unique charging pad having a plurality of cones which direct the legs of a charging drone into a specific location on the charging pad for charging/re-charging. A QR code may be located in the middle of a cover of a charging pad so that the charging drone may detect the charging pad from the air and may direct the charging drone to land on a specific spot on the landing pad for charging. The movable cover may cover the charging pad when the charging pad is not in use to protect the charging pad. When the charging drone approaches the charging pad the charging pad cover opens and exposes a second QR Code located on the top of the actual charging pad. A second (or "main") drone may be charged while airborne by the charging drone which may provide fresh battery power to the main drone.

An advantage of the present charging drone and system is that the present charging drone and system may have a camera which can detect a QR Code located on a top surface of a landing (or "charging") pad.

Yet another advantage of the present charging drone and system is that the present charging drone and system may have a charging pad which has a movable cover having a QR Code which splits into two units to reveal a second QR Code located on an interior landing pad located underneath the movable cover.

Still another advantage of the present drone charging/re-charging assembly and system is that the present drone charging/re-charging assembly and system may allow a main drone to remain airborne almost in perpetuity as a result of the main drone receiving fresh battery power from a plurality of charging drones.

For a more complete understanding of the above listed features and advantages of the present drone assembly and system reference should be made to the detailed description and the detailed drawings. Further, additional features and advantages of the invention are described in, and will be apparent from, the detailed description of the preferred embodiments.

DETAILED DESCRIPTION OF THE PREFERRED EMBODIMENTS

A charging and recharging drone assembly system and apparatus are provided. The system has a unique charging pad having a plurality of cones which direct the legs of a charging drone into a specific location on the charging pad for charging/re-charging. A QR code may be located in the middle of a cover of a charging pad so that the charging drone may detect the charging pad from the air and may direct the charging drone to land on a specific spot on the landing pad for charging. The movable cover may cover the charging pad when the charging pad is not in use to protect the charging pad. When the charging drone approaches the charging pad the charging pad cover opens and exposes a second QR Code located on the top of the actual charging pad. A second (or "main") drone may be charged while airborne by the charging drone which may provide fresh battery power to the main drone.

Figure 1:
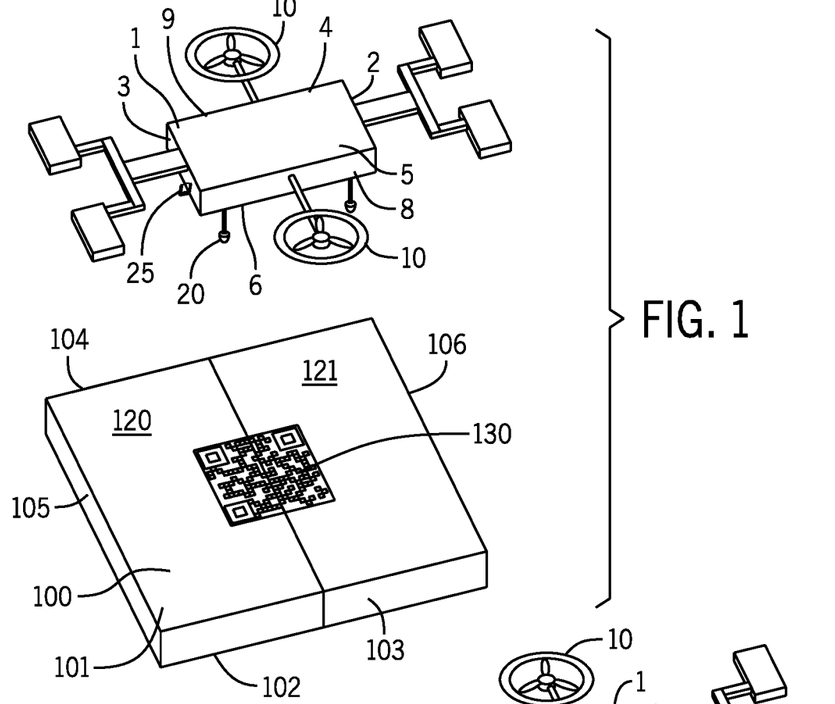
FIG. 1 illustrates a perspective view of the present charging drone airborne and the landing ("charging") pad wherein a cover of the landing pad is in the closed orientation.
Figure 4:
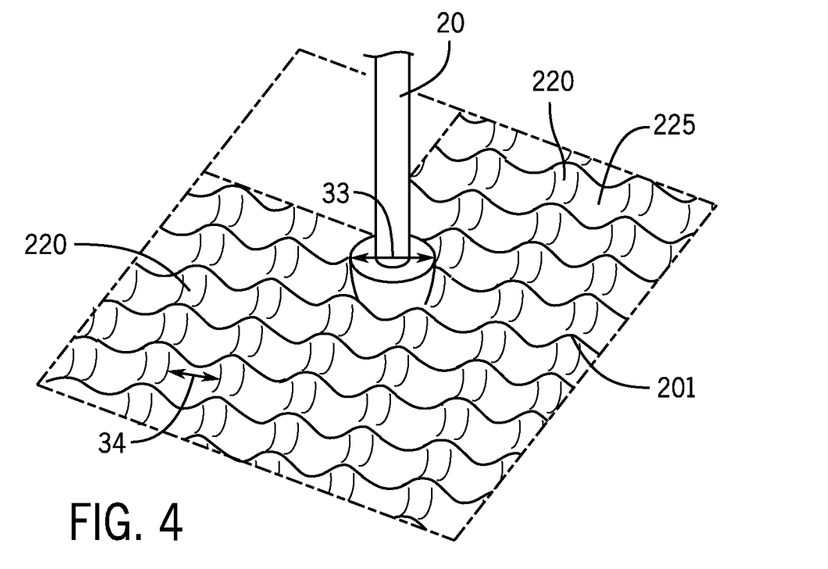
FIG. 4 illustrates a close-up view of a leg of the present charging drone located between cone-shaped pillars of the top of the interior landing pad.

Referring first to FIG. 1, in an embodiment a first charging drone 1 is provided. The first charging drone 1 may be used in connection with a landing pad 200 (FIG. 2) wherein the landing pad 200 has a movable landing pad cover 100 (FIG. 1). The first charging drone 1 may have a main body 5, plurality of propellers 10 and a plurality of legs 20. In an embodiment, the first charging drone 1 may have at least one camera 25. In an embodiment, cameras 25 on both the first charging drone 1 and on a second charging drone 880 (as discussed below) may at least detect QR Codes 530, 830 of a main drone 500 (FIG. 4).

Figure 5:
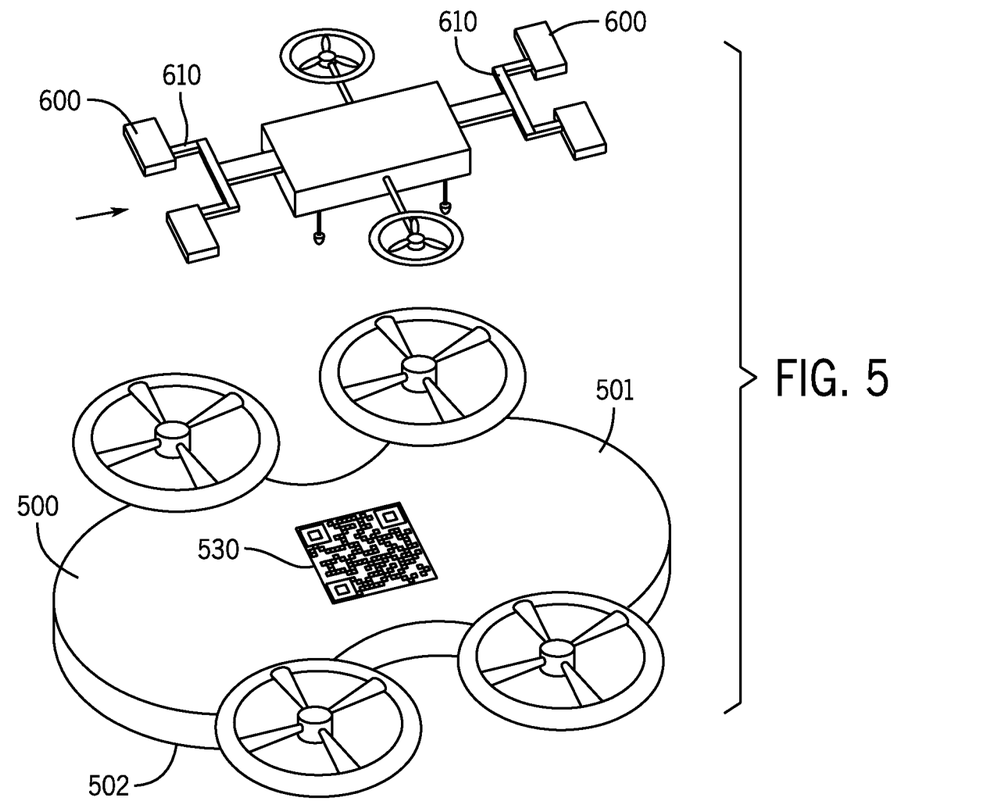
FIG. 5 illustrates a perspective view of the charging drone hovering over the main drone wherein the charging drone is in the process of landing on the main drone to recharge the main drone.

The first charging drone 1 may essentially be a flying "battery drone 1" which supplies fresh battery power to a second drone 500 (or "main drone" as shown in FIG. 5). In an embodiment, the main drone 500 may be made largely of a foam material which is durable and lightweight for prolonged flight. In an embodiment, the first charging drone 1 may have a first side 2, a second side 3, a top 5, a bottom 6, a front 8, a back 9 and a main body 4.

Figure 2:
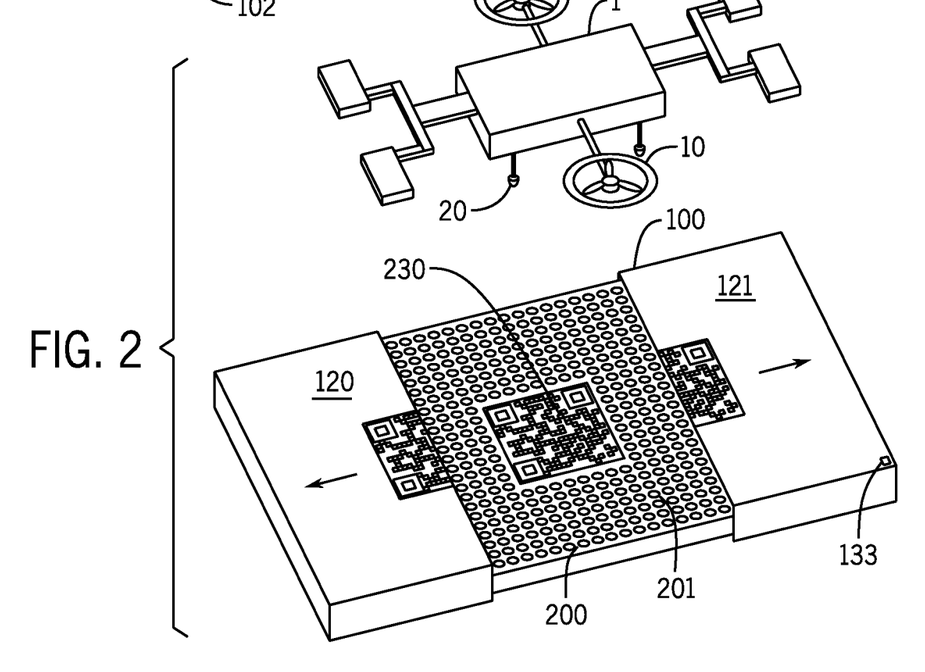
FIG. 2 illustrates a perspective view of the charging drone of the present system airborne and the landing pad wherein the cover of the landing pad is in the open orientation and the charging surface revealed to charge the charging drone.

In an embodiment, a landing/charging pad 200 and a landing pad cover 100 may be used in connection with the first charging drone 1 (and the second charging drone 880 as discussed below). The landing pad cover 100 may have a top 101, a bottom 102, a front 103, a back 104, a first side 105 and a second side 106. Further, the landing pad cover 100 may have a first unit 120 and a second unit 121. In an embodiment, the first unit 120 and the second unit 121 may move with respect to each other from a first (or "closed") orientation (FIG. 1) to a second (or "open") orientation (FIG. 2). The landing pad cover 100 may protect the interior landing/charging pad 200 from the weather and other elements by only exposing the interior landing/charging pad 200 for a brief time for charging the first or the second charging drones 1, 880 (as discussed below).

In an embodiment, the top 101 of the first unit 120 of the landing pad cover 100 may have half of a QR Code 130 and the top 101 of the second unit 121 may have the other half of the QR Code 130. Only when the first unit 120 and the second unit 121 of the landing pad cover 100 are in the first orientation (or "closed" orientation as shown in FIG. 1) will the QR Code 130 be readable (and therefore functional) by the camera 25 of the charging drones 1, 880. When the first unit 120 and the second unit 121 of the landing cover 100 are in the closed first orientation the interior landing/charging pad 200 (FIG. 2) is concealed and protected.

In an embodiment, the landing pad cover 100 may have a sensor/transmitted 133. The sensor/transmitted 133 may detect the presence of the charging drones 1, 880 hovering above it. In an embodiment, once either of the charging drones 1, 880 is detected by the sensor/transmitted 133 of landing pad cover 100 the first unit 120 and the second unit 121 may start to move away from each other from the first (or "closed") orientation of FIG. 1 to the second (or "open") orientation of FIG. 2.

In an embodiment, the QR Code 130 located on the top surface 101 of the landing pad cover 100 is moveable so that when the charging drone 1 detects the QR code 130 the charging drone 1 may land onto the pad cover 100 in an exact precise position on the landing pad 200 surface. In an embodiment, the landing pad cover 100 may open up when either of the charging drones 1, 880 is approximately two feet away from the top of the landing pad cover 100. After either of the charging drones 1, 880 charges and flies away, the landing pad cover 100 may automatically close again to conceal and protect the interior landing/charging surface 200.

Figure 3:
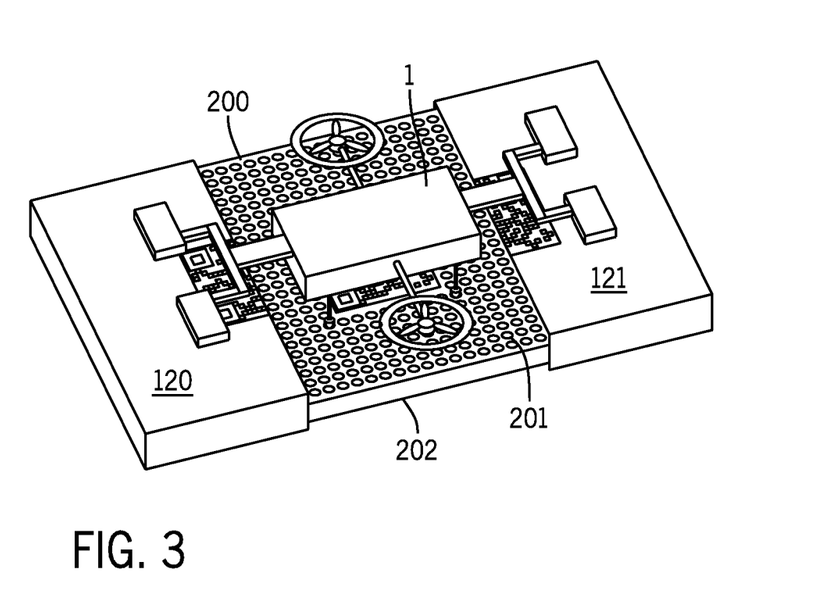
FIG. 3 illustrates a perspective view of the charging drone of the present system landed on the present landing pad wherein the landing (or "charging") pad is in the open orientation.

Referring now to FIGS. 3 and 4, when the first unit 120 and the second unit 121 of the landing pad cover 100 are in the open position of FIG. 2, the interior landing pad 200 becomes exposed. The interior landing pad 200 may have a top surface 201 and a bottom surface 202. The interior landing pad 200 may charge and/or recharge the charging drones 1, 880 so that the charging drones 1, 880 then, in turn, fly to and supply power to the main drone 500 to sustain flight 1 of the main drone 500.

The top surface 201 of the interior landing pad 200 may have a plurality of cone-shaped peaks 220. The cone-shaped peaks 220 may surround a plurality of valleys 225. The surface of the plurality of valleys 225 may have electrical contacts that allows for the charging of the charging drones 1, 880 when the charging drones 1, 880 land on the interior landing surface 200. In particular, the bottom of the legs 20 of the charging drones 1, 880 may have downward-facing cone-shaped tips 26 to oppose the upward facing cone peaks 220. The cone-shaped tips 26 of the legs 20 may allow the charging drones 1, 880 to both land on the landing pad surface 200 and may allow the charging drones 1, 880 to be charged by the landing pad surface 200. In particular, the cone-shaped tips 26 of the legs 20 of the charging drones 1, 880 may be metal having exposed electrical components which may establish a connection with the electrical valleys 225 of the interior landing/charging pad 200 so that electrical power may therein be transferred from the interior landing pad 200 to batteries in the charging drones 1, 880 through the electrical legs 20 of the charging drones 1, 880.

The cone-shaped tips 26 of the legs 20 of the charging drones 1, 880 may have a diameter 33 which is slightly less than a diameter 34 of the space between adjacent cone-shaped peaks 220 so that the cone-shaped peaks 220 direct the legs 20 down into the valleys 225 on the top 201 of the interior landing pad 200 for charging, recharging or for merely ending a flight session for the drones 1, 880.

In an embodiment, a second QR Code 230 may be located on the top 201 of the interior landing pad 200. Although the QR Codes 130, 230 are generally identical in the preferred embodiment, in one alternative embodiment, the QR Code 230 of the interior landing pad 200 may be different than the QR Code 130 of the top surface 101 of the landing pad cover 100 to provide different instructions to the charging drones 1, 880. As stated above, preferably, the QR Code 230 of the interior landing pad 200 may, for example, be identical to the QR Code 130 on the landing pad cover 100 so that the charging drones 1, 880 may continue to read the interior QR Code 230 and, therefore, land on the interior landing pad 200 at the exact right location while the exterior QR Code 130 is in the process of separating in two to expose the interior pad 200. More specifically, the charging drones 1, 880 may instantaneously switch from reading the cover QR Code 130 to reading the interior QR Code 230 as the landing pad cover 100 slides to the open orientation of FIG. 2.

Referring now to FIGS. 5-9, in an embodiment, the main drone 500 may be used in connection with the charging drones 1, 880 while the main drone 500 is still in flight. The main drone 500 may be the operational drone which covers great distance flying, takes pictures and videos, and is functional performing tasks while the two charging drones 1, 880 are generally identical drones which only serve to power the main drone 500.

The main drone 500 may have a top surface 501 and a bottom surface 502. The charging drones 1, 880 may recharge their batteries 600, 800 using the top 201 of the interior landing/charging pad 200 and then may fly to the main drone 500 while the main drone 500 is still in flight. Further, as the battery level of the main drone 500 starts to get low and reaches a predetermined level of power, the main drone 500 may transmit a wireless signal to the landing/charging pad 200 to instruct the landing/charging pad 200 to send the either of the charging drones 1, 880 to the main drone 500 so as to recharge the main drone 500 with fresh power.

Figure 6:
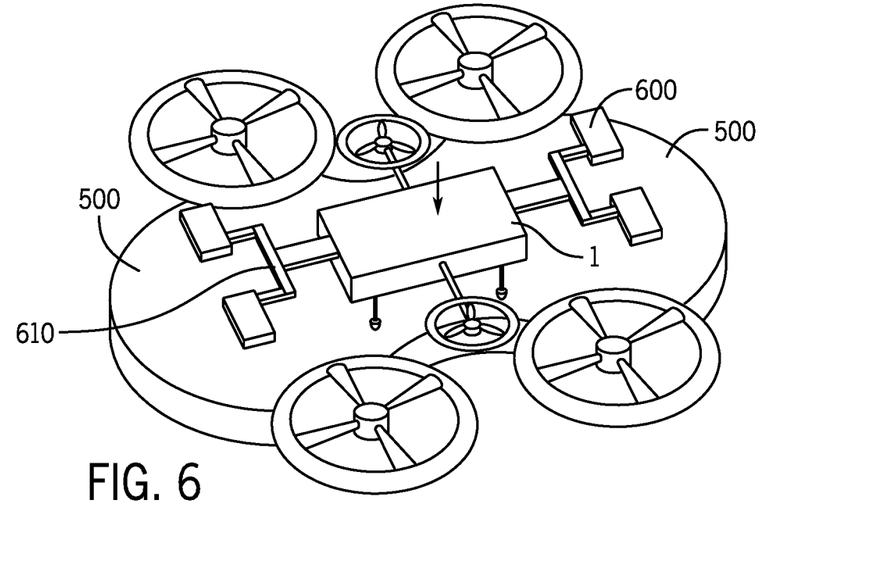
FIG. 6 illustrates a perspective view of charging drone landed on the top surface of the main drone.
Figure 7:
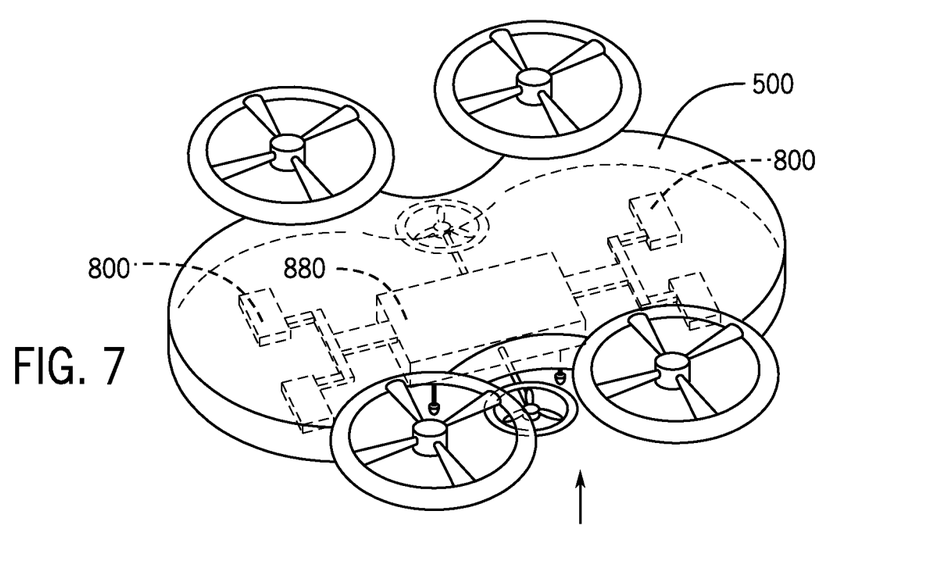
FIG. 7 illustrates a perspective view of a second charging drone attached to the underside of the main drone wherein the main drone is transparent for illustrative purposes.
Figure 8:
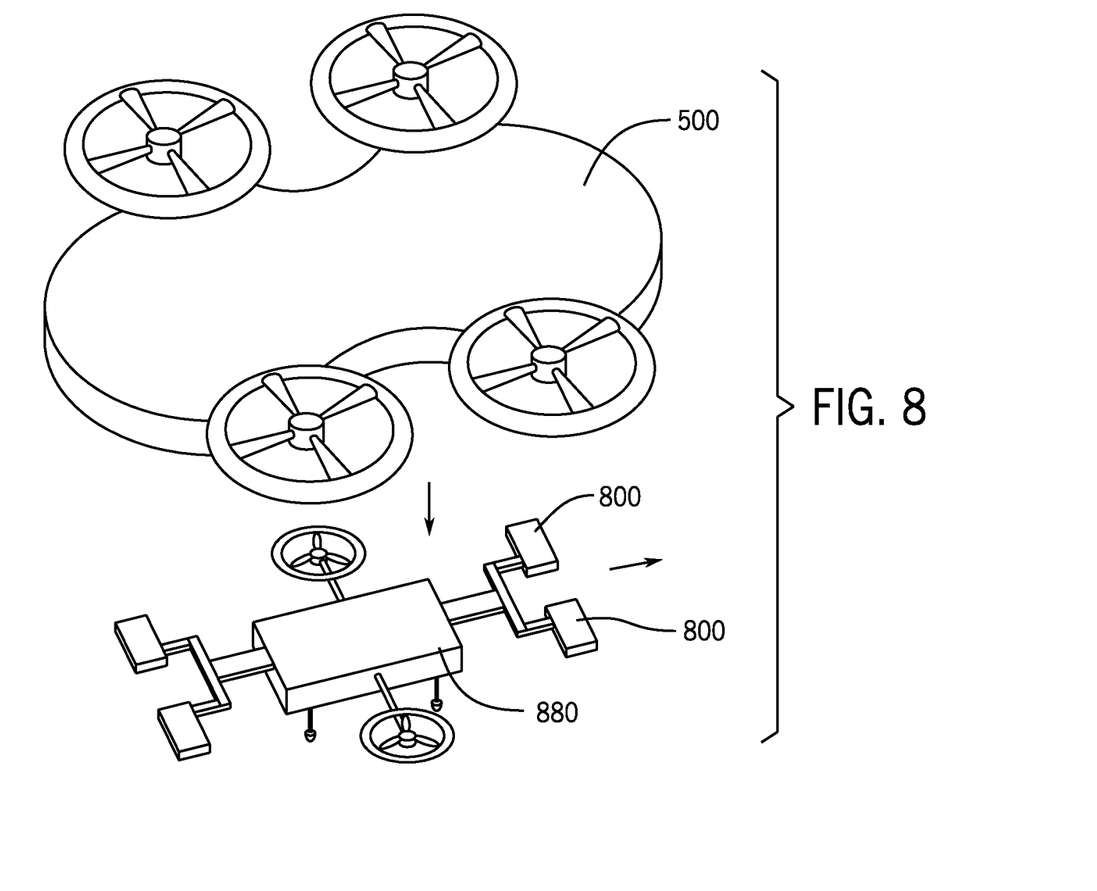
FIG. 8 illustrates the main drone with the second charging drone (with substantially spent batteries) leaving the underside of the main drone and traveling back to the charging pad for recharging of the second charging drone.
Figure 9:
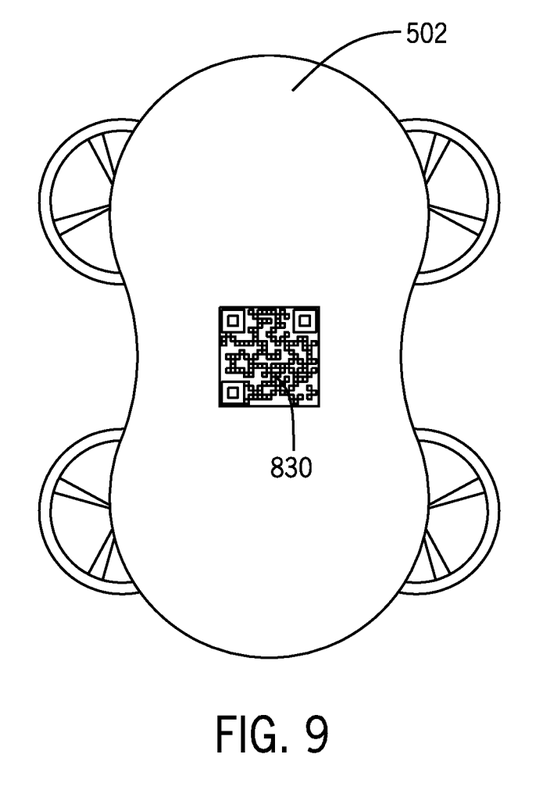
FIG. 9 illustrates the bottom of the main drone with the QR Code of the underside of the main drone visible.

As shown in FIG. 5, in an embodiment, the first charging drone 1 may hover over the main drone 500 when the main drone 500 is running low on power. FIG. 5 illustrates the first charging drone 1 approaching the main drone 500 in flight and FIG. 6 illustrates the first charging drone 1 landed on a top surface 501 of the main drone 500 while both drones 1, 500 are still in flight.

In an embodiment, the first charging drone 1 may detect the main drone 500 by receiving a wireless transmitter receiver signal from the main drone 500 and further with the help of camera 25 on the first charging drone 1. In an embodiment, a QR Code 530 (FIG. 5) may be located on the top surface 501 of the main drone 500 and may operate in a similar manner as the QR Code 230 on the top of the interior landing pad 200. Still another QR Code 830 (FIG. 9) is present on the bottom 502 of the main drone 500 in a similar manner as the QR Code 530 of the top surface 501 of the main drone 500.

After the first charging drone 1 reaches the top surface 501 of the main drone 500 the first charging drone 1 becomes secured to the main drone 500 and can then provide power to the main drone 500. Once the first charging drone 1 is secured to the top surface 501 of the main drone 500 a second charging drone 880 which is secured to the underside of the main drone 500 (seen in FIG. 7) may then become detached from the underside 502 of the main drone 500. The second charging drone 880 may have been providing power to the main drone 500 before the arrival of the first charging drone 1. Once the first charging drone 1 is secured to the main drone 500 and provides power to the main drone 500, the second charging drone 880, with its substantially spent batteries 800 then becomes detached from the underside 502 of the main drone 500 and flies back to the landing/charging pad 201 for recharging. The process continues with either the first drone 1 secured to the top 501 of the main drone 500 to power the main drone 500 or the second charging drone 880 secured to the underside of the main drone 500 to power the main drone 500. Therefore, the batteries 600 of the first charging drone 1 and the batteries 800 of the second charging drone 880 never leave their respective drones 1, 880.

As the legs 20 of the first charging drone 1 touch down on the top surface 501 of the main drone 500, batteries 600 secured to a battery holder 610 of the first charging drone 1 may now supply power to the main drone 500. The first charging drone 1 may be magnetic and may stick to the magnetic top 501 of the main drone 500 so that the first charging drone 1 does not fall off the main drone 500 in flight. A magnet on the second charging drone 880 may be used to secure the second charging drone 880 to the underside 502 of the main drone 500.

In an embodiment, there is always at least one charging drone 1 or 880 attached to either the top surface 501 or the bottom surface 502 of the main drone 500 (or both when the actual exchange is taking place) to provide the main drone 500 with power. When the first charging drone 1 or the second charging drone 880 becomes low on power, it sends a signal to the landing/charging pad 200 which will have the non-secured charging drone 1, 880 fully charged and ready to swap out. The process therefore allows the main drone 500 to be airborne almost in perpetuity.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. A drone charging system comprising:
a first drone wherein the first drone supplies power to a second drone when the first drone is attached to the second drone;
a landing pad wherein the landing pad both receives and charges the first drone and wherein the landing pad has a movable cover having a top surface wherein the movable cover has a first unit and a second unit and wherein the first unit is in contact with the second unit in a first orientation and wherein the first unit of the movable cover is not in contact with the second unit in a second orientation;
wherein the first drone flies to the second drone to charge the second drone;
a first QR Code located on the landing pad and wherein the first QR Code provides information to the first drone;
a second QR Code located on the top surface of the movable cover of the landing pad wherein the second QR Code is only readable when the movable cover is in the first orientation and wherein the second QR Code is not readable in the second orientation and wherein a portion of the second QR Code is printed on the first unit of the movable cover and wherein a portion of the second QR Code is printed on the second unit of the movable cover; and wherein the first QR Code located on the landing pad is completely concealed and not readable by the first drone when then movable cover is in the first orientation.

2. The drone charging system of claim 1 further comprising:

a top surface of the landing pad wherein the top surface of the landing pad has a plurality of cone-shaped protrusions and wherein the plurality of cone-shaped protrusions direct a leg of the first drone on the top surface of the landing pad.

3. The drone charging system of claim 1 further comprising:

a plurality of legs of the first drone wherein each of the plurality of legs of the first drone have a cone-shaped tip wherein the cone-shaped tip of each of the plurality of legs is directed on the landing pad by a plurality of opposing cone-shaped protrusions of a top surface of the landing pad.

4. The drone charging system of claim 1 further comprising:

a first magnet located on the first drone wherein the first magnet of the first drone is attracted to a first magnet of the second drone so that the first magnet of the first drone and the first magnet of the second drone secure the first drone to a top surface of the second drone.

5. The drone charging system of claim 1 further comprising:

a QR Code located on a top surface of the second drone wherein the QR Code of the top surface of the second drone directs the first drone to a specific landing position on the top surface of the second drone.

6. The drone charging system of claim 1 further comprising:

a QR Code located on a bottom surface of the second drone wherein the QR Code of the bottom surface of the second drone directs the first drone to a specific landing position on the bottom surface of the second drone.

7. The drone charging system of claim 1 further comprising:

a camera located on the first drone wherein the camera of the first drone detects a QR Code located on the landing pad.

8. The drone charging system of claim 1 further comprising:

a transmitter located on the landing pad wherein the transmitter transmits a wireless signal to the second drone.

9. The drone charging system of claim 1 wherein the first QR Code and the second QR Code are identical.

10. The drone charging system of claim 1 wherein the first QR Code on the cover of the landing pad and the second QR Code located on the landing pad are not identical.

11. The drone charging system of claim 1 wherein the second drone is made of a light foam material.

* * * * *